UNITED STATES PATENT OFFICE.

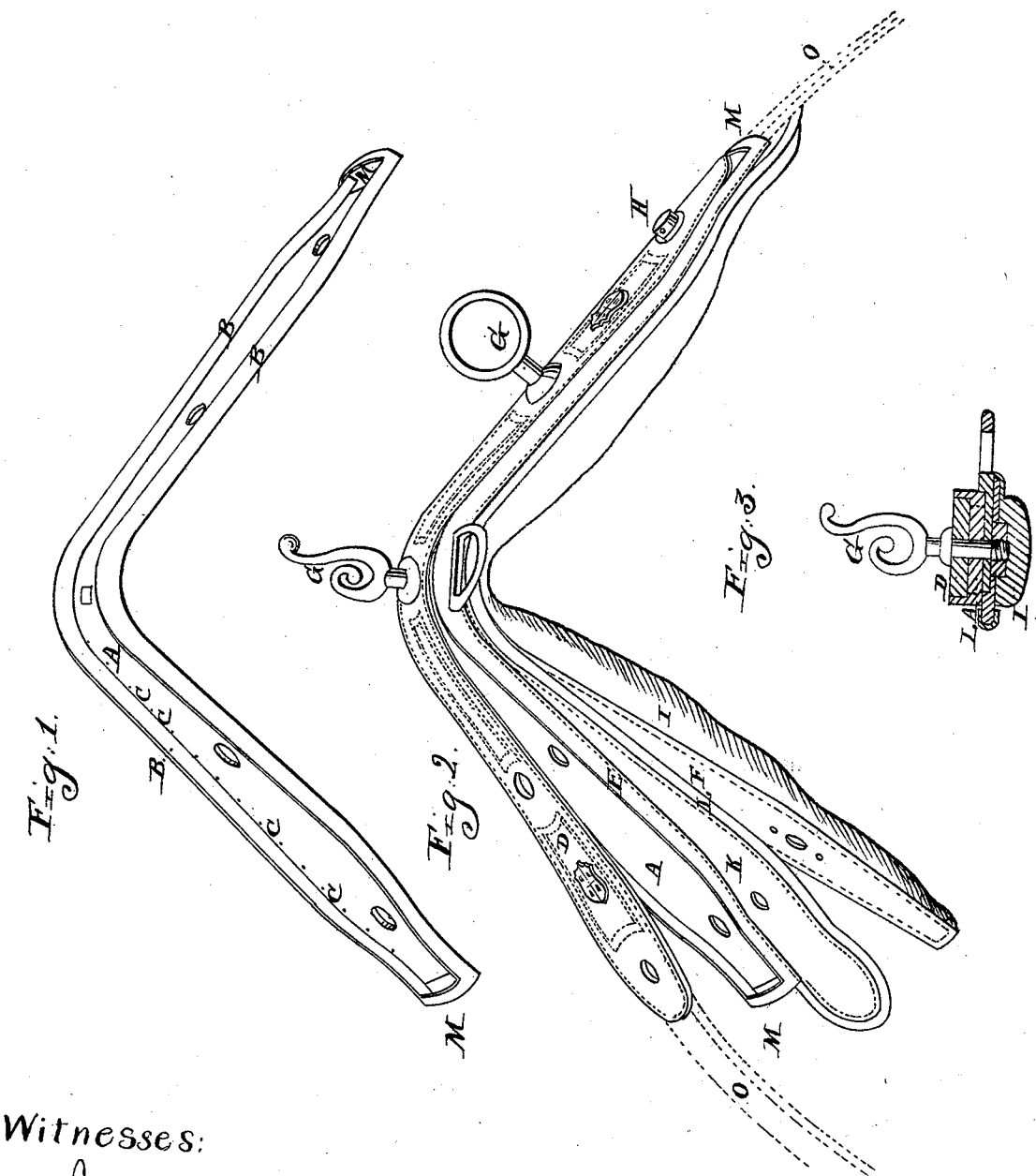

ALGERNON GILLIAM, OF PITTSBURG, PENNSYLVANIA.

IMPROVED HARNESS-SADDLE.

Specification forming part of Letters Patent No. 95,895, dated October 19, 1869.

*To all whom it may concern:*

Be it known that I, ALGERNON GILLIAM, of the city of Pittsburg, county of Allegheny and State of Pennsylvania, have invented a new and useful Improvement in Harness Saddles or Pads; and I hereby declare the following to be a full and exact description of the same, reference being had to the accompanying drawings, making a part of this specification.

Figure 1 represents a pad tree of my invention, made of malleable iron or other suitable metal. Fig. 2 represents all the parts necessary in the construction of the saddle—to wit, the tree, the skirting, the pad, and the outer covering of patent or other leather—combined and confined in position by the terrets and screws.

The nature of my invention consists in the construction of a saddle or harness tree, upon the ends of which loops M are formed, connecting the two flanges of the same, B B, and also in the construction of the housing K, which conforms to the shape and configuration of the saddle-tree, and sufficiently wider than the same to admit of the display of ornamental stitching near the edge thereof, of a binding of a different-colored piece of leather or other suitable material, so that by this mode of construction, when the different parts are put together, they possess great stability and firmness, easily taken apart, when required, for repair, &c.

The saddle or harness tree is made in a similar manner to that contained in my Letters Patent dated April 30, A. D. 1867, being of metal, with the flanges B B turned up upon the edges thereof, with this exception, that in the present application I form upon either end of said tree a loop, M, A being the bottom or base of the tree.

O is a heavy piece of leather, composed of one or more thicknesses, properly stitched and ornamented, fitting into and conforming to the shape of the saddle or harness tree, and passes through the loops M.

D is a top-piece of patent-leather, stitched to the strip O with silk.

K is the housing, conforming in shape to the harness or saddle tree, (made of leather,) but wider than the same, to admit of ornamental stitching and a fancy edge finish by binding or otherwise.

F is the heavy leather "burr-piece," to which the pad I is firmly attached, having adjusted within it the burrs or nuts, into which the terrets G and screws H enter, and when the same are screwed up the whole is held firmly and inseparably connected.

By the foregoing arrangement of the different parts, as described, the saddle acts as a unit, as if it were all constructed in one piece, and the motion of the horse cannot displace any of the parts, or allow them to move backward or forward separately, to their great injury.

I hereby disclaim all claim or title to the invention shown, described, and claimed in the patent of G. Marshall, dated November 5, A. D. 1867, or in the old model in the Examiner's room, as referred to; but

What I claim as my invention, and desire to secure by Letters Patent, is—

The tree A, with its upward-projecting flanges B, strengthened by means of the loop M at each end of the same and connecting said flanges, in combination with the patent-leather top-piece D, housing K, and pad I, in the manner and for the purpose herein set forth.

ALGERNON GILLIAM.

Witnesses:
E. T. CASSIDY,
ROBT. G. ATKINSON.